United States Patent
Zhu

(10) Patent No.: US 10,353,393 B2
(45) Date of Patent: Jul. 16, 2019

(54) METHOD AND SYSTEM FOR IMPROVING STABILITY OF AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 22 days.

(21) Appl. No.: 15/394,563

(22) Filed: Dec. 29, 2016

(65) Prior Publication Data
US 2018/0188734 A1     Jul. 5, 2018

(51) Int. Cl.
| | |
|---|---|
| *B62D 6/00* | (2006.01) |
| *G05D 1/02* | (2006.01) |
| *G08G 1/01* | (2006.01) |
| *B60W 30/095* | (2012.01) |
| *G08G 1/056* | (2006.01) |
| *G01S 19/42* | (2010.01) |

(52) U.S. Cl.
CPC ......... *G05D 1/0212* (2013.01); *B60W 30/095* (2013.01); *B62D 6/001* (2013.01); *B62D 6/002* (2013.01); *G08G 1/0125* (2013.01); *G08G 1/056* (2013.01); *B60W 2530/00* (2013.01); *B60W 2530/20* (2013.01); *B60W 2550/10* (2013.01); *B60W 2550/14* (2013.01); *B60W 2550/146* (2013.01); *B60W 2550/148* (2013.01); *G01S 19/42* (2013.01); *G05D 1/0236* (2013.01); *G05D 1/0242* (2013.01); *G05D 1/0257* (2013.01)

(58) Field of Classification Search
CPC ......... B62D 6/00; B62D 15/025; G08G 1/167
See application file for complete search history.

(56) References Cited

U.S. PATENT DOCUMENTS

| | | | | |
|---|---|---|---|---|
| 2012/0323473 A1* | 12/2012 | Irie | ...................... | B60W 10/06 701/117 |
| 2016/0288830 A1* | 10/2016 | Hori | ..................... | B62D 15/025 |
| 2016/0311431 A1* | 10/2016 | Kato | ...................... | B62D 1/28 |

\* cited by examiner

*Primary Examiner* — Anshul Sood
(74) *Attorney, Agent, or Firm* — Womble Bond Dickinson (US) LLP

(57) ABSTRACT

In one embodiment, perception information is received, the perception information perceiving a driving scenario of an autonomous driving vehicle (ADV). A path from a first location to a second location is planned and determined based on a driving scenario obtained based on the perception information. A tolerance area along the determined path is determined based on the perception information. The autonomous driving vehicle is driven within the tolerance area according to the path. No lateral error is committed if the autonomous driving vehicle is moving within the tolerance area. A lateral error is considered committed only if the autonomous driving vehicle is moving outside of the tolerance area.

24 Claims, 7 Drawing Sheets

METHOD AND SYSTEM FOR IMPROVING STABILITY OF AUTONOMOUS DRIVING VEHICLES

TECHNICAL FIELD

Embodiments of the present invention relate generally to operating autonomous vehicles. More particularly, embodiments of the invention relate to improving stability of autonomous driving of vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, when controlling an autonomous driving vehicle (ADV), the vehicle may move winding (or swinging, drifting) around a given path due to the nature of driving on a particular road. In traditional planning, the planning system generates a single path indicating the best path between two points. However, when commanding the vehicle to follow the given path, the vehicle may not exactly follows the path. Instead it may wind or swing left and right around the path. As a result, the control system may have to make a correction. During relatively high speed driving, such a correction may be over correction or under correction, which may cause the passengers uncomfortable.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
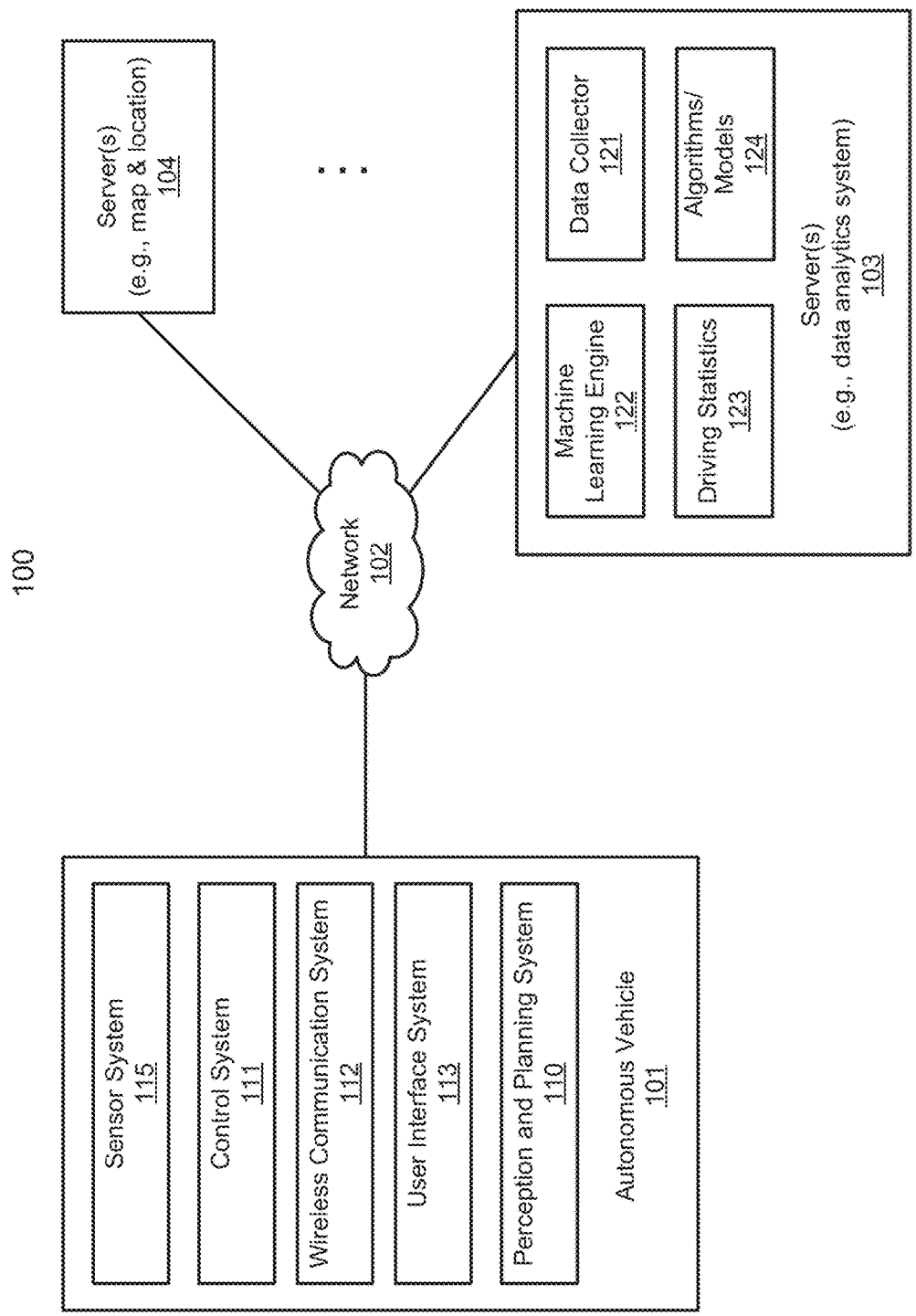
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when planning a path from one point to another point, in addition to planning a path, a tolerance area is also designed based on the driving environment at the point in time to provide a buffer zone along the path. That is, the path is designed with a path width. When controlling the vehicle, if the vehicle moves within the tolerated area or buffer zone along the path, the vehicle would not be considered committing a lateral error and no lateral error correction is performed. A lateral error correction is performed only if the vehicle moves outside of the tolerance area. That is, if the vehicle is drifting off the center of the path but still within the tolerance area, no lateral error is committed and no lateral error correction is performed. The width or size of the tolerance area may be determined at real-time dependent upon the circumstances at the point in time (e.g., width of the road, traffic congestion, obstacles, pedestrians, and/or curvature of the path). As a result, the number of lateral error connections can be reduced and the passengers can feel more comfortable.

According to one embodiment, perception information is received, where the perception information perceives a driving scenario of an autonomous driving vehicle. A path is planned from a first location to a second location based on the perception information. A tolerance area for the path is determined based on the perception information. The autonomous driving vehicle is then driven within the tolerance area along the path. The tolerance area includes a left curve and a right curve enclosing the path sandwiched in between and the vehicle is attempted to move within the left curve and the right curve without considering causing a lateral error, even if the vehicle drifts off the center of the path. When the vehicle moves outside of the tolerance area of the path, it is considered a lateral error has been committed and a lateral error correction is then performed.

In one embodiment, the left curve and the right curve define the tolerance area, serving as tolerance area guards. The size and shape of the tolerance area is dynamically determined based on the perception of the driving environment at the point in time including, but is not limited to, road condition (e.g., friction, road width, curvature of the road), vehicle's characteristics (e.g., width of the vehicle, turning radius, tire width/pressure), and/or traffic condition (e.g., traffic congestion, opposing traffic, obstacles, pedestrians). The goal of the tolerance area is to allow the vehicle to move smoothly without having to perform unnecessary lateral correction, to cause passengers uncomfortable, or to cause potential problems to other vehicles, obstacles, or pedestrians.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
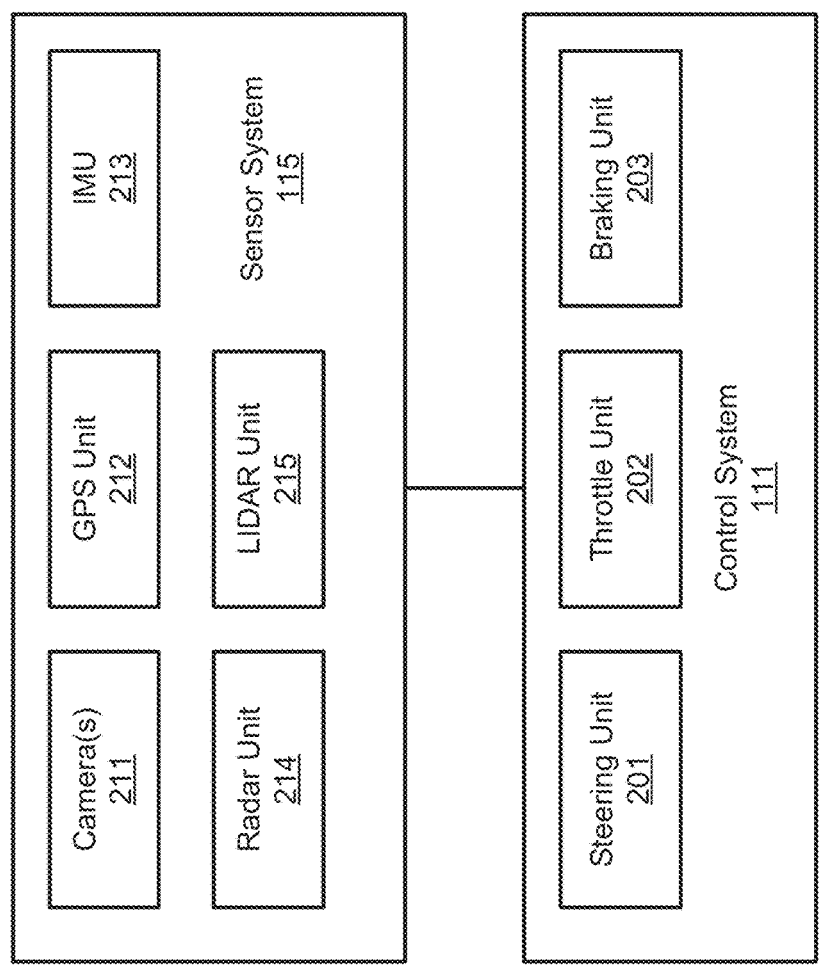
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes, such as, for example, algorithms or models to determine tolerance areas for a path under a variety of driving environments or driving scenarios. The algorithm or models 124 may be created and trained based on driving statistics 123 that were collected from a variety of types of vehicles under a variety of driving environments or driving conditions. Algorithms or models 124 may generate a left curve/guard and a right curve/guard for a particular path at real-time to provide a tolerance area for the path in view of the perception of driving environment at the point in time. For example, given a path that is planned based on the perception information perceiving a driving environment, the driving parameters associated with the path may be determined, such as, curvature of the path, target speed of the vehicle, turning direction of the vehicle, etc. These parameters are then fed into the algorithms or models to generate the left and right curves along the path as a tolerance area. The tolerance area is then utilized to guide controlling the vehicle, which may affect the control command generations and issuing at different points in time, as well as the timing of the potential lateral error correction.

Figure 3:
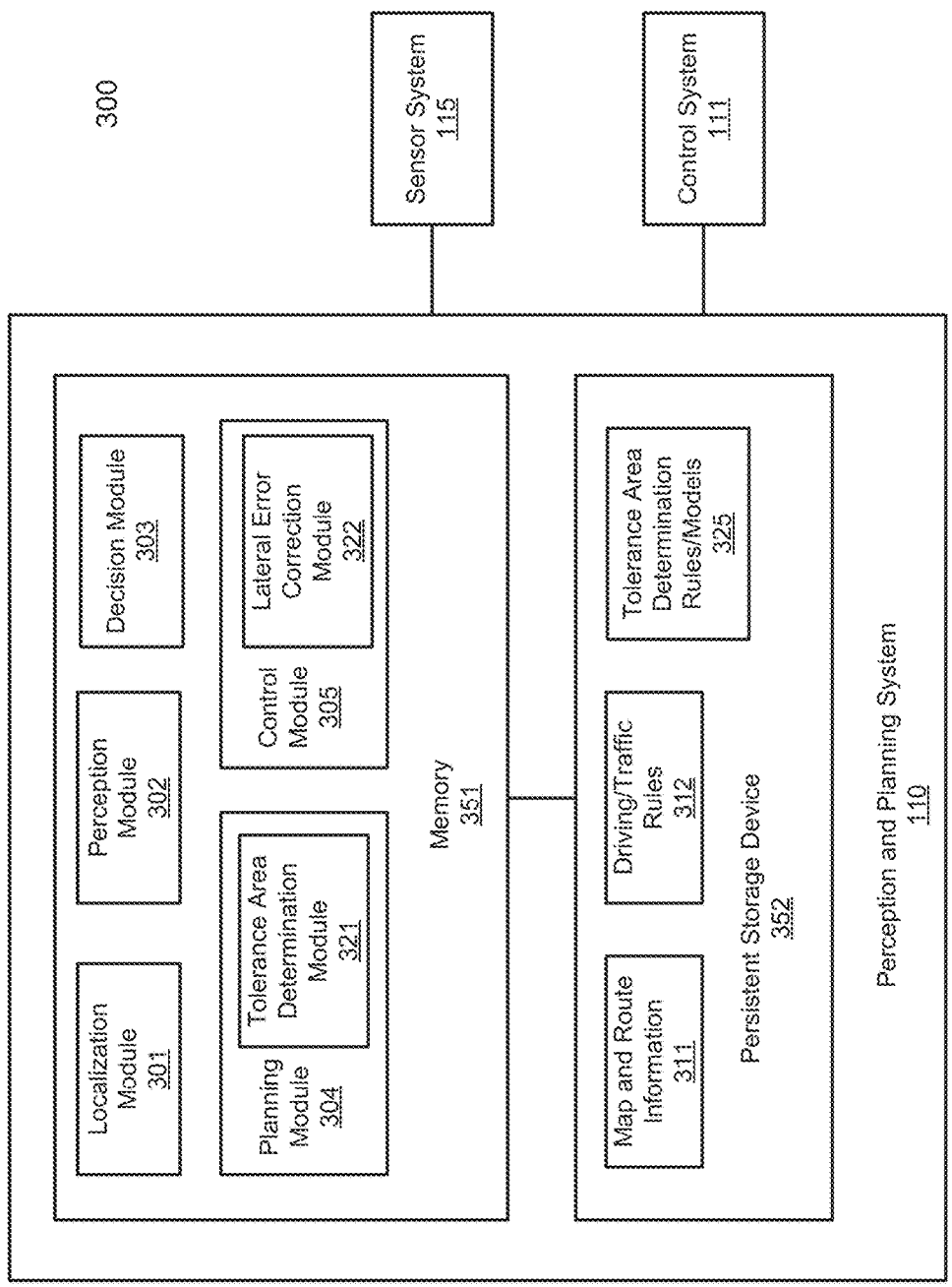
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/ path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, planning module 304 includes a tolerance area determination module 321 to determine a tolerance area for a path using tolerance area determination rules, algorithms, or models 325. Tolerance area algorithms or models 325 may be created and trained offline by a data analytics system such as data analytics system 103 based on a large amount of driving statistics associated with the same type or similar type of autonomous driving vehicle 300.

In one embodiment, when planning a path from one point to another point, in addition to planning a path by planning module 304, a tolerance area is also determined by tolerance determination module 321 based on the driving environment at the point in time to provide a buffer zone along the path. That is, the path is designed with a path width, where the path width defines the tolerance area with respect to the center of the target path. The path information is then transmitted from planning module 304 to control module 305, including information describing the tolerance area associated with the path.

In response to the planning and control data received from planning module 304, control module 305 generates and issues a series of control commands (e.g., throttle, brake, steering) to the vehicle platform or chassis at different points in time along the path to control the vehicle to move according to the target path. When controlling the vehicle by control module 305, if the vehicle moves within the tolerated area or buffer zone along the path, the vehicle would not be considered committing a lateral error and no lateral error correction is performed by control module 305. A lateral error correction is performed by lateral error correction module 322 only if the vehicle moves outside of the tolerance area. That is, if the vehicle is drifting off the center of the path but still within the tolerance area, no lateral error is committed and no lateral error correction is performed. The width or size of the tolerance area may be determined at real-time dependent upon the circumstances at the point in time (e.g., width of the road, traffic congestion, obstacles, pedestrians, and/or curvature of the path). As a result, the number of lateral error connections can be reduced and the passengers can feel more comfortable.

According to one embodiment, perception information is received, where the perception information perceives a driving scenario of an autonomous driving vehicle. A path is planned from a first location to a second location based on the perception information. A tolerance area for the path is determined by tolerance area determination module 321 based on the perception information. The autonomous driving vehicle is then driven within the tolerance area along the path. The tolerance area includes a left curve (also referred to as a left edge, left path) and a right curve (also referred to as a right edge, right path) enclosing the path (also referred to as a target path, a center path) sandwiched in between and the vehicle is attempted to move within the left curve and the right curve without considering causing a lateral error, even if the vehicle drifts off the center of the path. When the vehicle moves outside of the tolerance area of the path (e.g., outside of the left curve or right curve), it is considered that a lateral error has been committed and a lateral error correction is then performed by lateral error correction module 322.

Figure 4:
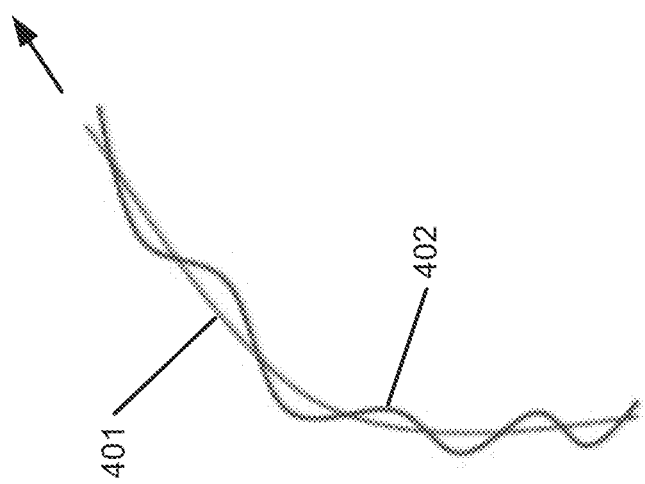
FIG. 4 shows a path along which an autonomous driving vehicle typically moves.

Referring now to FIG. 4, FIG. 4 shows a typical path 401 that is generated by planning module 304 based on perception information provided by perception module 302 and decision information provided by decision module 303, amongst other information. Based on the planning and control data representing path 401, control module 305 generates and issues control commands (e.g., throttle, brake, steering commands) to the vehicle. However, due to certain unforeseen factors (e.g., road condition, weather condition, vehicle weight), the vehicle typically moves and winds around the target path 401 as shown in path 402. When the vehicle drifts off the target path 401, which is considered as a lateral error laterally off the target path 401, a conventional control system will typically performs a lateral error correction in an attempt to correct or turn the vehicle back to target path 401. Sometimes, such lateral correction operations are performed too often or premature that may cause the vehicle winging too much and too often. Such behaviors caused by the frequently performed lateral error correction operations may cause the passengers uncomfortable and sometimes not safe for autonomous driving.

Figure 5:
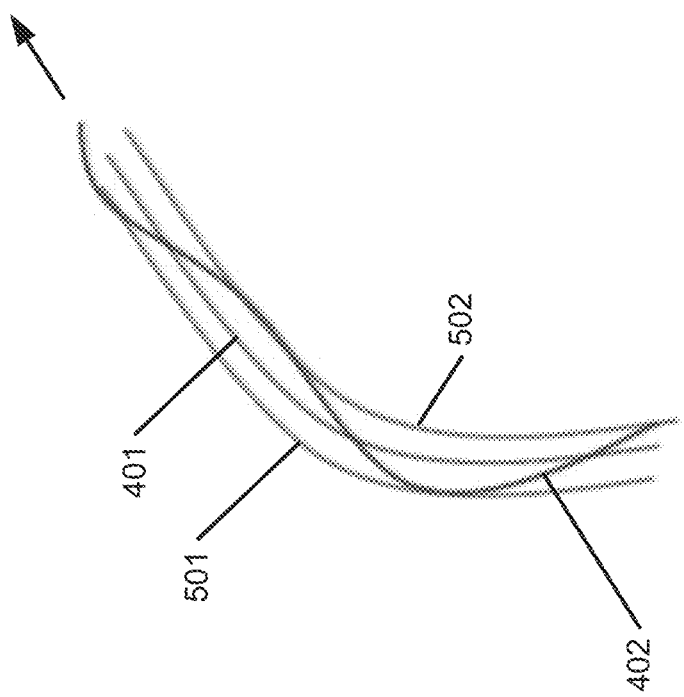
FIG. 5 shows a path with a tolerance area according to one embodiment of the invention.

According to one embodiment, with a design of tolerance area specifically configured for the driving environment at the point in time, the number of lateral error correction operations may be reduced and the passengers may feel more comfortable without causing a dangerous driving condition to others. FIG. 5 shows a path with tolerance area specifically designed and configured for target path 401. Referring to FIG. 5, in addition to planning and determining target path 401, the tolerance determination module determines a tolerance area along target path 401. The tolerance area along path 401 includes a left curve or path 501 and a right curve or path 502 with respect to a moving direction of a vehicle.

In one embodiment, the left curve 501 and the right curve 502 define the tolerance area, serving as tolerance area guards. The size and shape of the tolerance area (e.g., shape and width between curves 501-502) is dynamically determined based on the perception of the driving environment at the point in time including, but is not limited to, road condition (e.g., friction, road width, curvature of the road, weather condition), vehicle's characteristics (e.g., width and weight of the vehicle, turning radius, tire width/pressure), and/or traffic condition (e.g., traffic congestion, opposing traffic, obstacles, pedestrians). The goal of the tolerance area is to allow the vehicle to move smoothly without having to perform unnecessary lateral correction, to cause passengers uncomfortable, or to cause potential problems to other vehicles, obstacles, or pedestrians.

A lateral error refers to an amount of drifting off the center of a target path by a vehicle due to a variety of factors (e.g., unplanned drifting or moves). When the amount of drifting exceeds a predetermined threshold, the vehicle is considered committing a lateral error. How much drifting is considered to be a lateral error may vary dependent upon driving or traffic rules 312 associated with the vehicle. A lateral correction refers to an operation of correcting a lateral error to guide the vehicle back to the target path, such as, for example, by issuing a steering command to turn the vehicle towards back to the center of the target path. Control module 305 may further issue a speed control command to slow down the vehicle while the vehicle is turning back to the target path.

In one embodiment, as long as the vehicle is moving within the tolerance area defined by curves 501-502, there is lateral error occurred. A lateral error correction is performed only if the vehicle moves outside of curves 501-502. As a result, the number of unnecessary lateral correction operations can be greatly reduced and the passengers can feel more comfortable.

Figure 6:
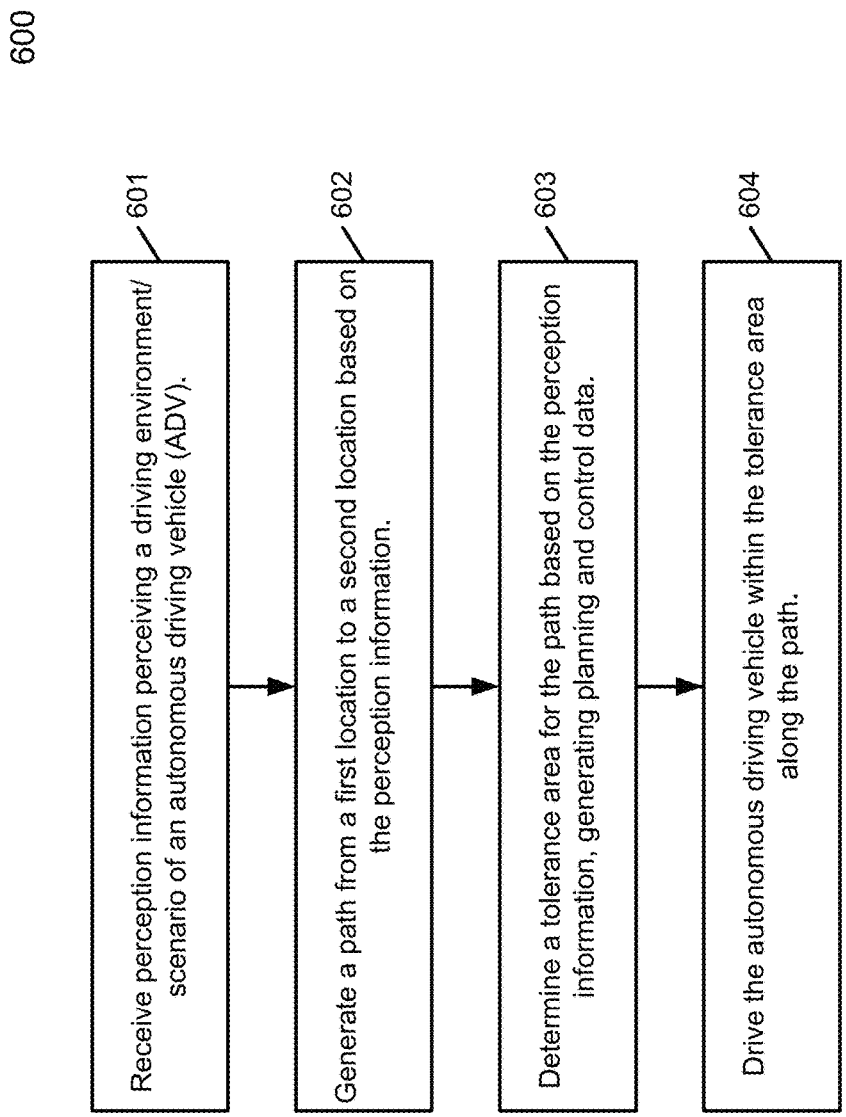
FIG. 6 is a process of operating an autonomous driving vehicle according to one embodiment of the invention.

FIG. 6 is a flow diagram illustrating a process of operating an autonomous driving vehicle according to one embodiment of the invention. Process 600 may be performed by processing logic which may include software, hardware, or a combination thereof. For example, process 600 may be performed by tolerance area determination module 321 of planning module 304 and/or control module 305. Referring to FIG. 6, in operation 601, processing logic receives perception information that perceives a driving environment or driving scenario of an autonomous vehicle. Processing logic may also receive decision information regarding a decision concerning each of the objects (e.g., another vehicle, pedestrian, obstacles, traffic lights) perceived. In operation 602, processing logic plans and determines a path (e.g., a target path) from a first location to a second location based on the perception information and/or decision information. In operation 603, processing logic determines a tolerance area along the path based on the perception information using some or all of the techniques described above. Planning and control data is generated based on the path and the tolerance area of the path. In operation 604, processing logic drives the vehicle according to the path and the tolerance area associated with the path based on the planning and control data.

Figure 7:
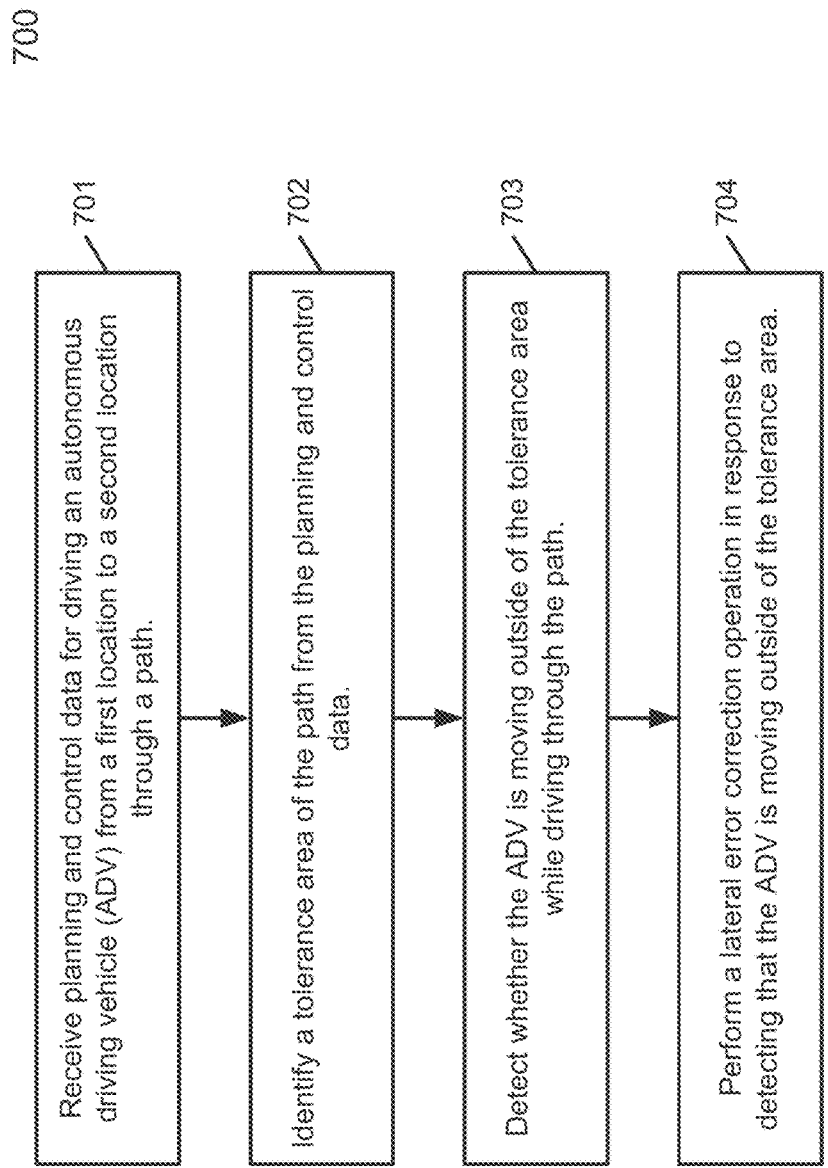
FIG. 7 is a process of operating an autonomous driving vehicle according to another embodiment of the invention.

FIG. 7 is a flow diagram illustrating a process of operating an autonomous driving vehicle according to another embodiment of the invention. Process 700 may be performed by processing logic which may include software, hardware, or a combination thereof. For example, process 700 may be performed by control module 305. Referring to FIG. 7, in operation 701, processing logic receives planning and control data for driving an autonomous driving vehicle from a first location and a second location through a path. In operation 702, processing logic identifies a tolerance area associated with the path from the planning and control data. In operation 703, processing logic detects whether the autonomous driving vehicle is moving outside of the tolerance area while driving through the path. In response to detecting that the vehicle is moving outside of the tolerance area, processing logic performs a lateral correction operation; otherwise, no lateral error correction is performed.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
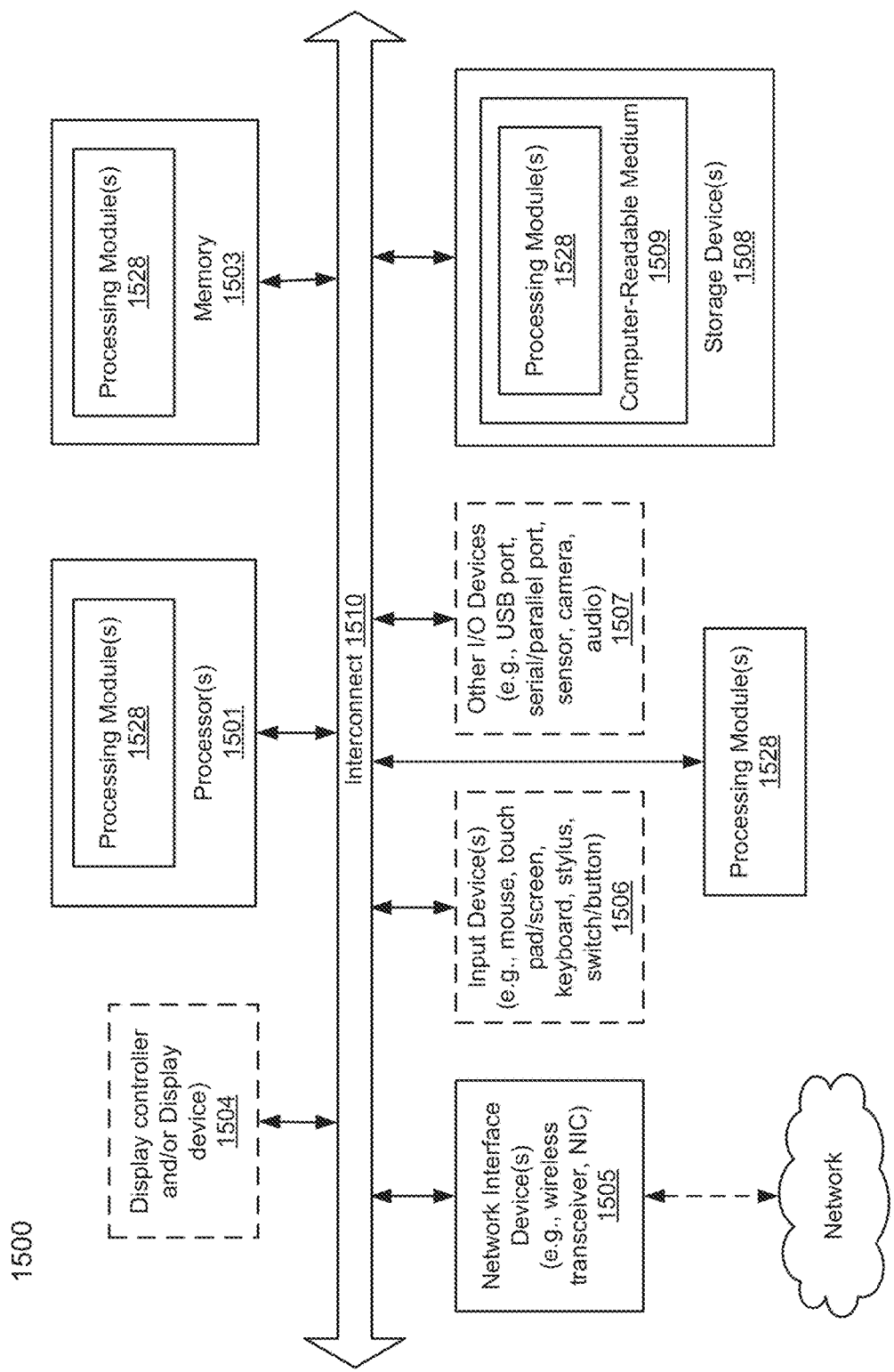
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304 and/or control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   receiving perception information, the perception information perceiving a driving scenario of the autonomous driving vehicle (ADV);
   planning a path from a first location to a second location based on a driving scenario obtained based on the perception information;
   determining a tolerance area along the determined path based on the perception information, the tolerance area comprising a left curve and a right curve enclosing the determined path; and
   driving the ADV within the tolerance area according to the determined path, wherein a lateral error is committed if the ADV moves outside the tolerance area;
   performing a lateral error correction of the ADV only in response to the ADV moving outside the tolerance area, thereby minimizing a total number of lateral error corrections while driving the ADV within the tolerance area.

2. The method of claim 1, wherein determining a tolerance area comprises determining the left curve and the right curve enclosing the determined path sandwiched therein, and wherein the autonomous driving vehicle is driven within the left curve and the right curve.

3. The method of claim 2, wherein driving the autonomous driving vehicle comprises:
   detecting that the autonomous driving vehicle is moving outside of the left curve or the right curve; and
   performing a lateral error correction, in response to detecting that the autonomous driving vehicle is moving outside the left curve or the right curve.

4. The method of claim 3, wherein a size and shape of the tolerance area is dynamically determined for the path based on a perception of the driving environment at a point in time.

5. The method of claim 1, wherein the tolerance area is determined based on a road width of a road on which the autonomous vehicle is moving.

6. The method of claim 1, wherein the tolerance area is determined based on a vehicle width of the autonomous driving vehicle.

7. The method of claim 1, wherein the tolerance area is determined based on a curvature of a road on which the autonomous driving vehicle is moving.

8. The method of claim 1, wherein the tolerance area is determined based on an opposing traffic of a road on which the autonomous driving vehicle is moving.

9. A non-transitory machine-readable medium having instructions stored therein, which when executed by a processor, cause the processor to perform operations, the operations comprising:
receiving perception information, the perception information perceiving a driving scenario of an autonomous driving vehicle (ADV);
planning a path from a first location to a second location based on a driving scenario obtained based on the perception information;
determining a tolerance area along the determined path based on the perception information, the tolerance area comprising a left curve and a right curve enclosing the determined path; and
driving the ADV within the tolerance area according to the determined path, wherein a lateral error is committed if the moves outside the tolerance area;
performing a lateral error correction of the ADV only in response to the ADV moving outside the tolerance area, thereby minimizing a total number of lateral error corrections while driving the ADV within the tolerance area.

10. The machine-readable medium of claim 9, wherein determining a tolerance area comprises determining the left curve and the right curve enclosing the determined path sandwiched therein, and wherein the autonomous driving vehicle is driven within the left curve and the right curve.

11. The machine-readable medium of claim 10, wherein driving the autonomous driving vehicle comprises:
detecting that the autonomous driving vehicle is moving outside of the left curve or the right curve; and
performing a lateral error correction, in response to detecting that the autonomous driving vehicle is moving outside the left curve or the right curve.

12. The machine-readable medium of claim 11, wherein a size and shape of the tolerance area is dynamically determined for the path based on a perception of the driving environment at a point in time.

13. The machine-readable medium of claim 9, wherein the tolerance area is determined based on a road width of a road on which the autonomous vehicle is moving.

14. The machine-readable medium of claim 9, wherein the tolerance area is determined based on a vehicle width of the autonomous driving vehicle.

15. The machine-readable medium of claim 9, wherein the tolerance area is determined based on a curvature of a road on which the autonomous driving vehicle is moving.

16. The machine-readable medium of claim 9, wherein the tolerance area is determined based on an opposing traffic of a road on which the autonomous driving vehicle is moving.

17. A data processing system, comprising:
a processor; and
a memory coupled to the processor to store instructions, which when executed by the processor, cause the processor to perform operations, the operations including
receiving perception information, the perception information perceiving a driving scenario of an autonomous driving vehicle (ADV),
planning a path from a first location to a second location based on a driving scenario obtained based on the perception information,
determining a tolerance area along the determined path based on the perception information, the tolerance area comprising a left curve and a right curve enclosing the determined path, and
driving the ADV within the tolerance area according to the determined path, wherein a lateral error is committed if the ADV moves outside the tolerance area;
performing a lateral error correction of the ADV only in response to the ADV moving outside the tolerance area, thereby minimizing a total number of lateral error corrections while drive the ADV within the tolerance area.

18. The system of claim 17, wherein determining a tolerance area comprises determining the left curve and the right curve enclosing the determined path sandwiched therein, and wherein the autonomous driving vehicle is driven within the left curve and the right curve.

19. The system of claim 18, wherein driving the autonomous driving vehicle comprises:
detecting that the autonomous driving vehicle is moving outside of the left curve or the right curve; and
performing a lateral error correction, in response to detecting that the autonomous driving vehicle is moving outside the left curve or the right curve.

20. The system of claim 19, wherein a size and shape of the tolerance area is dynamically determined for the path based on a perception of the driving environment at a point in time.

21. The system of claim 17, wherein the tolerance area is determined based on a road width of a road on which the autonomous vehicle is moving.

22. The system of claim 17, wherein the tolerance area is determined based on a vehicle width of the autonomous driving vehicle.

23. The system of claim 17, wherein the tolerance area is determined based on a curvature of a road on which the autonomous driving vehicle is moving.

24. The system of claim 17, wherein the tolerance area is determined based on an opposing traffic of a road on which the autonomous driving vehicle is moving.

* * * * *